(12) United States Patent
Alvin

(10) Patent No.: US 6,451,081 B1
(45) Date of Patent: Sep. 17, 2002

(54) MULTI-MEMBRANE FILTER

(75) Inventor: Mary Anne Alvin, Pittsburgh, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 1072 days.

(21) Appl. No.: 08/636,431

(22) Filed: Apr. 23, 1996

(51) Int. Cl.$^7$ .......................... B01D 39/20; B01D 46/24
(52) U.S. Cl. ........................ 55/523; 55/341.1; 55/524
(58) Field of Search .................. 55/302, 341.1, 55/350.1, 523, 524

(56) References Cited

U.S. PATENT DOCUMENTS

| | | | |
|---|---|---|---|
| 3,162,516 A | * 12/1964 | Dwyer | 55/524 X |
| 4,324,574 A | * 4/1982 | Fagan | 55/524 X |
| 4,360,433 A | * 11/1982 | Walker et al. | 55/524 X |
| 4,531,957 A | * 7/1985 | Malik | 55/524 X |
| 4,539,025 A | 9/1985 | Ciliberti et al. | 55/302 |
| 4,699,637 A | * 10/1987 | Iniotakis et al. | 55/524 X |
| 4,735,635 A | 4/1988 | Israelson et al. | 55/71 |
| 4,764,190 A | 8/1988 | Israelson et al. | 55/269 |
| 4,826,519 A | 5/1989 | Miyagi et al. | 55/487 |
| 4,865,630 A | * 9/1989 | Abe et al. | 55/524 X |
| 4,923,487 A | * 5/1990 | Bogart et al. | 55/523 X |
| 4,946,487 A | * 8/1990 | Butkus | 55/523 |
| 4,968,467 A | * 11/1990 | Zievers | 55/524 X |
| 4,976,760 A | * 12/1990 | Helferich et al. | 55/523 X |
| 5,071,457 A | * 12/1991 | Schmidt, Jr. et al. | 55/524 X |
| 5,073,178 A | * 12/1991 | Mimori et al. | 55/524 X |
| 5,143,530 A | 9/1992 | Haldipur et al. | 55/341.1 |
| 5,238,478 A | * 8/1993 | Zievers et al. | 55/524 X |
| 5,260,035 A | * 11/1993 | Lachman et al. | 55/524 X |
| 5,409,515 A | * 4/1995 | Yamamoto et al. | 55/524 X |
| 5,460,637 A | * 10/1995 | Connolly et al. | 55/523 X |
| 5,492,679 A | * 2/1996 | Ament et al. | 55/523 X |
| 5,500,029 A | * 3/1996 | Zievers et al. | 55/524 X |
| 5,518,530 A | * 5/1996 | Sakai et al. | 55/524 X |
| 5,605,553 A | 2/1997 | Connolly et al. | 55/487 |

FOREIGN PATENT DOCUMENTS

NL          7713116          5/1978

* cited by examiner

Primary Examiner—Robert H. Spitzer
(74) Attorney, Agent, or Firm—Eckert Seamans Cherin & Mellott, LLC

(57) ABSTRACT

A filter element having a plurality of membrane layers. The filter element has a filter member having a porous sidewall. The sidewall has an outer surface and an inner surface which allow a gas to flow through. A first membrane is in communication with the outer surface for preventing particulate matter from penetrating the outer surface. A second membrane is in communication with the inner surface for preventing particulate matter from penetrating the inner surface.

9 Claims, 3 Drawing Sheets

MULTI-MEMBRANE FILTER

FIELD OF THE INVENTION

This invention relates generally to high temperature gas cleanup systems and more particularly to a hot gas clean up multi-membrane filter for filtering out fine dirty particulate matter from a gas and protecting intact filter elements from irreversible blinding operating in the presence of failed filter elements.

BACKGROUND OF THE INVENTION

Hot gas cleanup systems that are implemented to clean particulate matter from a gas stream are well known in the art. These systems are currently used to clean coal fired gas, pressurized fluidized-bed combustion gas, gasification, and waste incineration. Additionally, these gas cleanup systems may be applied to catalyst and precious metal recovery, calcination, catalytic cracking, and recovering material during chemical processing.

Conventional hot gas cleanup systems generally comprise a filter assembly which is mounted within a pressure vessel. The filter assembly further comprises a plurality of filter elements; a plurality of tube sheets for supporting the filter elements; plenum pipes; and a back pulse system for cleaning particulate matter from the filter elements. These systems may employ a variety of filter elements to filter out dirty particulates from a gas stream.

Examples of typical filter elements employed include cross-flow filters as disclosed in U.S. Pat. No. 4,737,176 to Ciliberti, and hereby incorporated by reference, filter bags as disclosed in U.S. Pat. No. 4,764,190 to Ciliberti and hereby incorporated by reference, porous metal filters, ono-layer membrane filters, ceramic circular cylindrical filters (candle and tube filters) that have either one open end and one closed end, or two open ends, i.e. ASAHI filter element.

Filter elements are generally mounted within a pressure vessel so that a gas can flow through the filter element such that a substantial part of dirty fine particulates within the gas can be removed therefrom. Typically, as a gas stream flows through a filter element, dirty fine particulates collect on the outside of the filter while the clean gas flows through the filter media, into the plenum pipes, and out into the clean gas side of the tube sheets. A substantial amount of the dirty fine particulates that are collected on the outside of the filter element are removed therefrom by a reverse gas pulse provided by the back pulse system which blows the particulates off of the filter element. The removed dirty fine particulates are then collected in a hopper and discharged.

Another type of tubular filter element that is employed is one having side walls that define a bore and two open ends, and a membrane on the inside surface, i.e. ASAHI system. A dirty gas passes along the inside diameter of the tube to be filtered with the cleaned gas passing through the wall and released along the outside diameter of the filter element.

Filter elements may break when particulate ash builds up or bridges, or because of material degradation; i.e. thermal shock, thermal fatigue, creep or cracking growth. When a filter element breaks or fails, particulates continue to travel to the clean gas side of the tube sheet thus causing several problems. Once the particulates are on the clean side, particulates will enter the interior of adjacent intact filter elements when the back pulse system is activated, thereby contaminating the intact filter elements by filling or blinding the filter element pores.

Currently, when filter elements break or fail, the entire cleanup system must be shut down for a number of days so that the broken filter elements can be located and replaced. The contaminated filter elements, however, are left intact. Unfortunately, with the contaminated filter elements still in the system, a loss in the filtering performance of the entire system is incurred. It would, therefore, be desirable to provide an improved filter element that will mitigate the chances of filter contamination and enhance the filtering capabilities of the entire cleanup system.

SUMMARY OF THE INVENTION

In accordance with the present invention, a filter element having a plurality of membrane layers is provided. The filter element comprises a filter member having a porous sidewall. The sidewall includes an outer surface and an inner surface which allow a particulate laden gas to flow through so that particulates may be filtered. A first membrane is in communication with the outer surface to prevent particulate matter from penetrating the outer surface. A second membrane is in communication with the inner surface for preventing particulate matter from penetrating the inner surface.

BRIEF DESCRIPTION OF THE DRAWINGS

The accompanying drawings which are incorporated in and constitute a part of the specification, illustrate one embodiment of the invention and together with the description, serve to explain the principles of the invention.

DETAILED DESCRIPTION OF THE INVENTION

Figure 1:
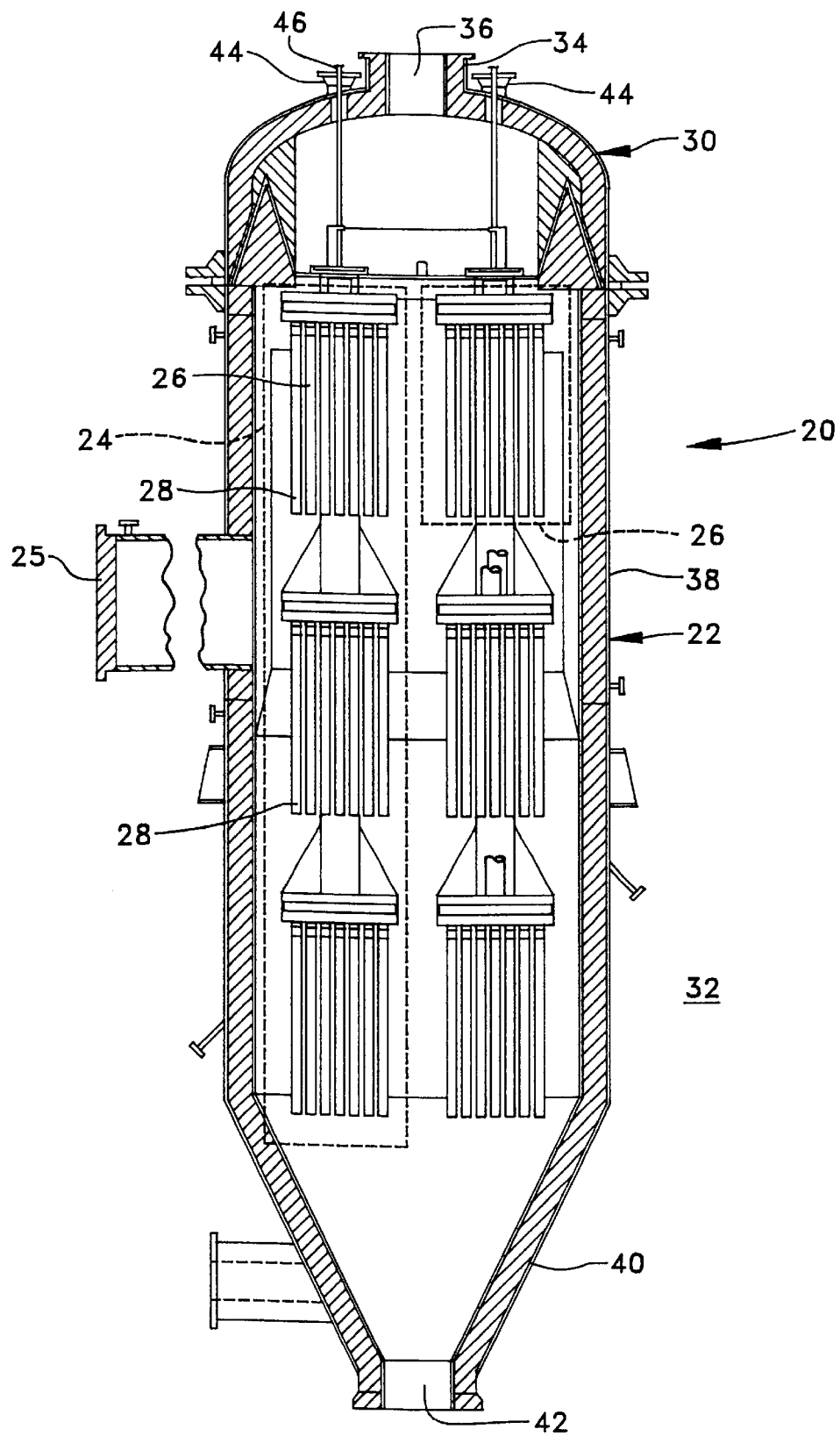
FIG. 1 is a longitudinal section view of a pressure vessel incorporating multi-membrane filter elements in accordance with the present invention.

FIG. 1 shows a filtering apparatus 20 for separating particulate matter from a gas stream. The apparatus includes a pressure vessel 22 in which a plurality of clusters 24 are mounted. Each cluster 24 comprises a plurality of filter element arrays 26. Each filter element array 26 includes a plurality of filter elements 28.

The pressure vessel 22 has a dome-shaped head 30 and a body 32. The dome-shaped head 30 terminates in a linear tip 34, defining an exit opening or nozzle 36 for the gas processed in the vessel 22. The body 32 includes a dirty gas inlet 25, and an upper part 38 having a generally circular cylindrical shape joined by a frusto conical lower part 40. The lower part 40 is formed to receive particulate matter. The lower part 40 includes a linear tip that defines an opening or nozzle 42 that is connected to a hopper (not shown) for collecting particulate matter. A plurality of ports 44 extend from the dome-shaped head 30. The ports 44 provide a site for inserting instrumentation and for viewing the interior of the dome-shaped head 30 during shut-down periods. Tubes 46 for supplying a back pulse burst of gas for cleaning the candle filters 28 are coupled to corresponding ports 44.

Figure 2:
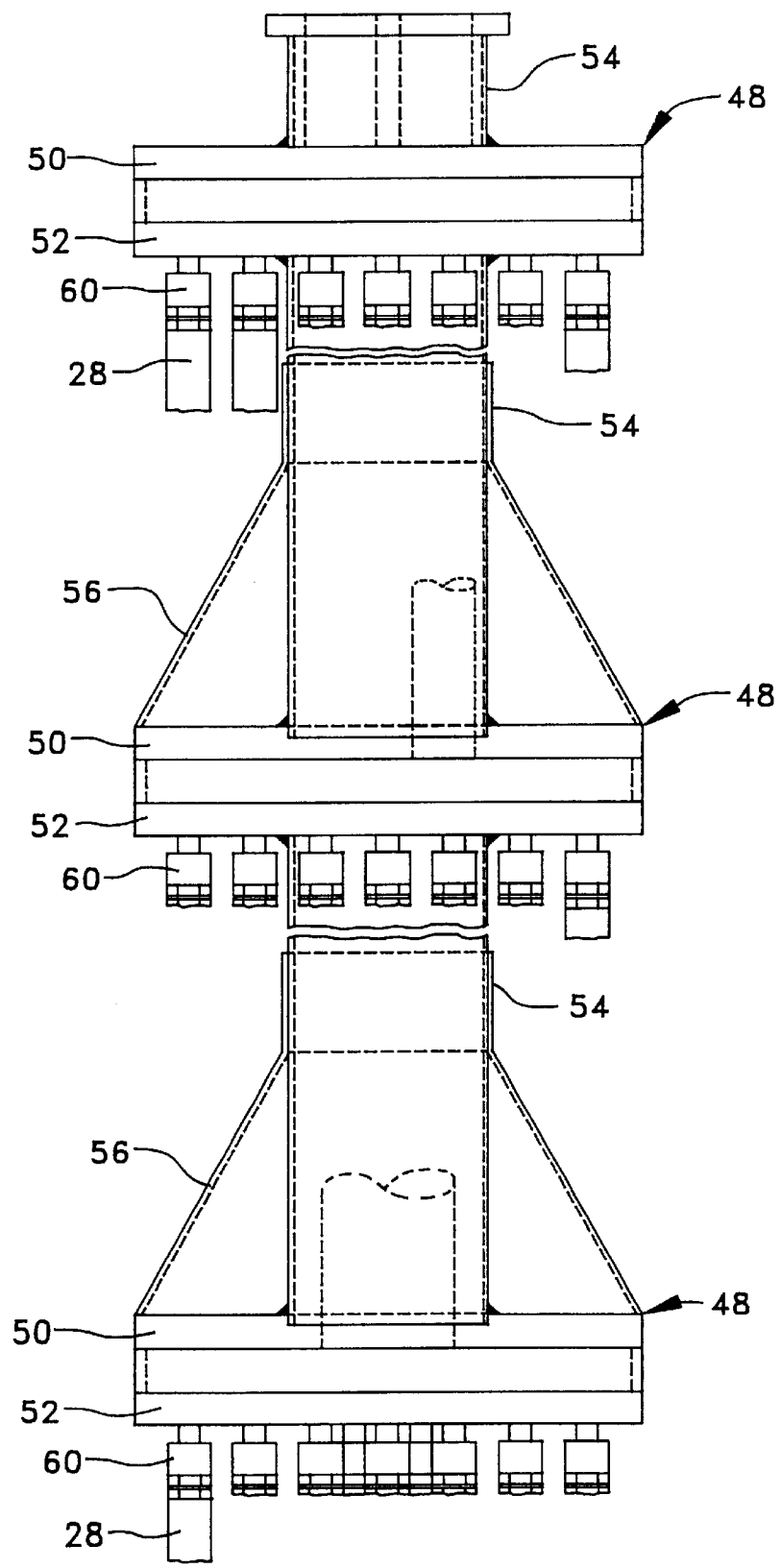
FIG. 2 is a side elevation view of a multi-membrane filter element array coupled to a tube sheet inside the pressure vessel shown in FIG. 1.

Referring to FIG. 2, the pressure vessel includes a tube sheet 48. Each tube sheet 48 comprises an upper plate 50 and a lower plate 52. Each filter element 28 is held within a filter holder and gasket assembly 60 and coupled to a corresponding lower plate 52. The filter elements 28 are integrated into a structural unit by plenum pipes 54. Each plenum pipe 54 is secured centrally (coaxially) within the pressure vessel 22. A shed or particle-deflector 56 having a generally frusto-conical shape is attached above each tube sheet 50.

Figure 3:
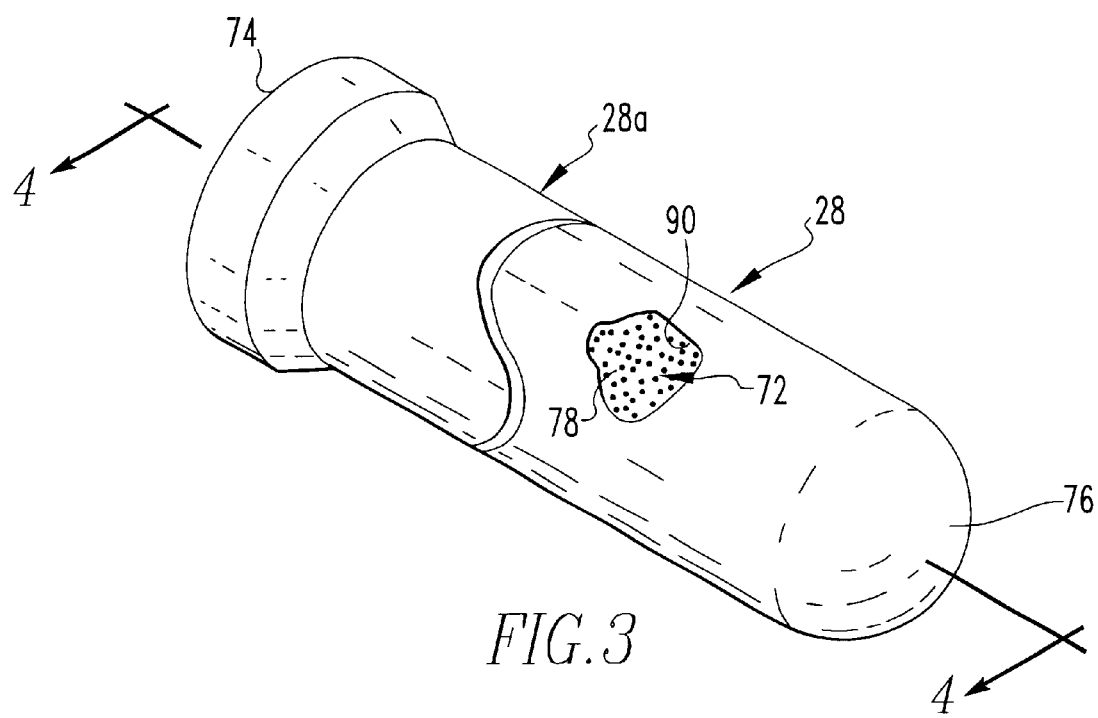
FIG. 3 is an perspective view of the multi-membrane filter element in accordance with the present invention.

Referring to FIG. 3, a filter element 28, preferably a hollow tubular filter element, in accordance with the present invention is shown. The filter element 28 comprises a candle filter member 28a that has a porous sidewall 72, a closed end 76 and an open end 74. The porous sidewall 72 includes an outer surface 78 and an inner surface 80 (shown in FIG. 4). The preferred embodiment of the filter element comprises a first membrane layer 90 and a second membrane layer 92 (shown in FIG. 4) for use in a conventional gas clean up system. The first membrane 90 is in communication with the outer surface 78. The second membrane 92 is in communication with the inner surface 80 (shown in FIG. 4). The membrane layers 90, 92 are provided to prevent particulate matter from penetrating the filter pores when either the back pulse system is activated or during normal gas flow.

Figure 4:
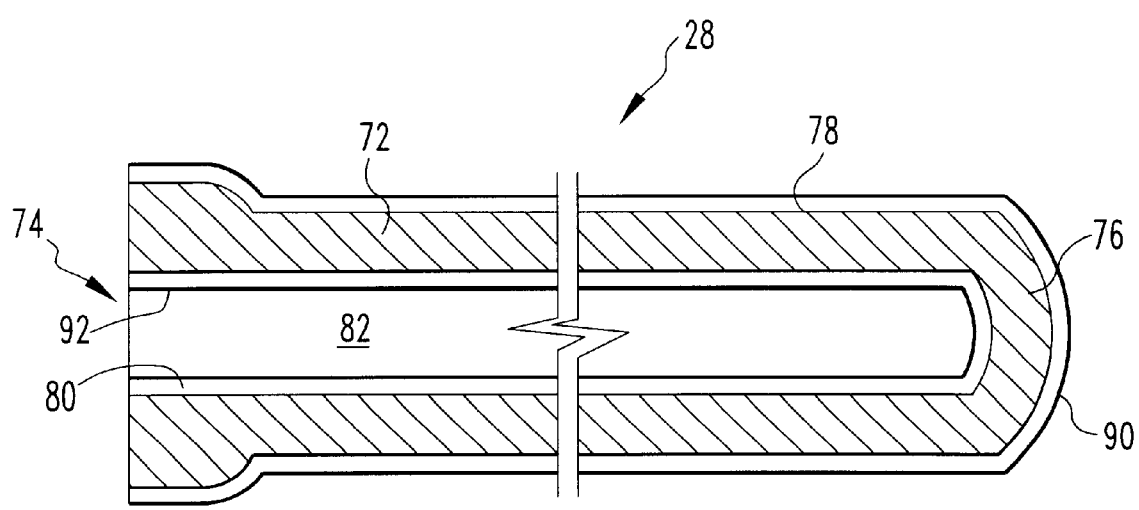
FIG. 4 is cross-sectional view taken along section line 4—4 of the multi-membrane filter shown in FIG. 3.

Referring to FIG. 4, the porous sidewall 72, outer surface 78, inner surface 80, and membranes 90, 92 are shown in more detail. The sidewall 72 defines a bore 82 which extends beginning at the open end 74 and terminates at the closed end 76. The bore 82 provides a flow path for either a clean gas or particulate laden gas.

Each membrane layer 90, 92 is preferably made from a porous ceramic or sintered metal material, but can also be comprised of a finer grain material similar to the underlying support matrix; a chopped or continuous finer fibrous matrix layer; sintered metal; a finer or more tightly wrapped ceramic yarn that is either coated or non-coated; or fiber bundles consisting of particulates, CVI, and Sol-gel and like matrix.

The membrane layers 90, 92 can be applied to a filter element that is made of a monolithic ceramic material, composite ceramic material, sintered metal material, or composite metal material. The membrane layers 90, 92 are preferably applied to the filter elements during the filter element manufacturing process. The membrane layers 90, 92 can be applied by a slurry process, isopressing process, chemical vapor infiltration process, a winding process, vacuum infiltration process, slip casting process, and the like.

It is noted that the candle filter element 28 may be either a conventional candle filter or an "inverted" candle filter. The conventional candle filter is employed within a cleanup system such that a particulate laden gas passes through the outer surface 78 of the filter element and out through the inner surface 80 while the clean gas travels through the bore 82 to the clean gas side of the pressure vessel. In contrast, the "inverted" candle filter element is employed in a cleanup system such that the particulate laden gas flows through the bore 82 and the inner surface 80 to be filtered while the clean gas flows out through the outer surface 78 of the filter element.

It is noted that those skilled in the art will appreciate that the present invention can be applied to other types of filter elements, such as cross-flow filter elements, a tubular filter element having two open ends, such as the ASAHI system, all of which may be employed within gas clean up systems.

The clean up system in accordance with the preferred embodiment of the present invention permits particulate laden gas to enter through the dirty gas inlet 25. Particulate matter from the gas collects on the outer surface 78 of each filter element 28. The filtered clean gas proceeds through the bore 82 and into the clean gas side of the tube sheet 50. The clean gas then travels through each plenum pipe 54 until reaching and exiting the dome gas outlet 36. Periodically, particulate matter is dislodged from the filter elements 28 by short pulses of compressed gas that is provided by the back pulse system.

The present invention may be embodied in other forms without departing from the spirit or essential attributes thereof, and accordingly, reference should be made to the appended claims, rather than to the foregoing specification, as indicating the scope of the invention.

What is claimed is:

1. A filter element comprising:
    a filter member, said filter member having an open end, a closed end, and a porous sidewall, said side wall defining a bore which extends from a location beginning at said open end and terminates at the closed end for allowing a gas to flow, said sidewall having an outer surface and an inner surface which allow a gas to flow through;
    a first membrane in communication with said outer surface for preventing particulate matter from penetrating into said sidewall from the outer surface;
    a second membrane in communication with said inner surface for preventing particulate matter from penetrating into said sidewall from the inner surface; and
    wherein said first and second membranes have a finer porous structure than the sidewall.

2. The filter element of claim 1 wherein said first and second membranes are made of any one of the group consisting of a finer porous ceramic grained material similar to the sidewall, sintered metal, a finer fibrous chopped matrix layer, a finer fibrous continuous matrix layer, a wrapped ceramic yarn comprising particulates, CVI, and Sol-gel, and a coated wrapped ceramic yarn comprising particulates, CVI, and Sol-gel.

3. The filter element of claim 1 wherein said filter member is made of a material from the group consisting of a monolithic ceramic, composite ceramic, and a sintered metal material.

4. The filter element of claim 1 wherein said filter member has a substantially circular cylindrical cross-section.

5. A filter element comprising:
    a filter member, said filter member having a porous sidewall, said sidewall having an outer surface and an inner surface which allow a gas to flow through;
    a first membrane in communication with said outer surface for preventing particulate matter from penetrating into said sidewall from the outer surface;
    a second membrane in communication with said inner surface fo particulate matter from penetrating into said sidewall from the inner surface; and
    wherein said first and second membranes have a finer porous structure than the sidewall.

6. The filter element of claim 5 wherein said first and second membranes are made of any one of the group consisting of a finer porous ceramic grained material similar to the underlying support matrix, sintered metal, a finer fibrous chopped matrix layer, a finer fibrous continuous matrix layer, a wrapped ceramic yarn comprising particulates, CVI, and Sol-gel, and a coated wrapped ceramic yarn comprising particulates, CVI, and Sol-gel.

7. The filter element of claim 5 wherein said filter member is made of material from the group consisting of a monolithic ceramic, composite ceramic, and a sintered metal material.

8. The filter element of claim 5 wherein said filter member is a cross-flow filter.

9. The filter element of claim 5 wherein said sidewall defines two opposing open ends and a bore therebetween.

* * * * *